G. McEACHRON.
FLOUR SIFTER.
APPLICATION FILED MAR. 8, 1913.
1,137,068.
Patented Apr. 27, 1915.
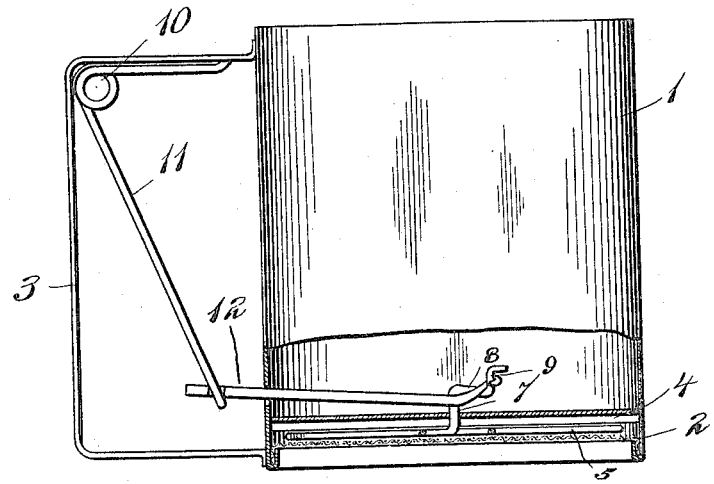
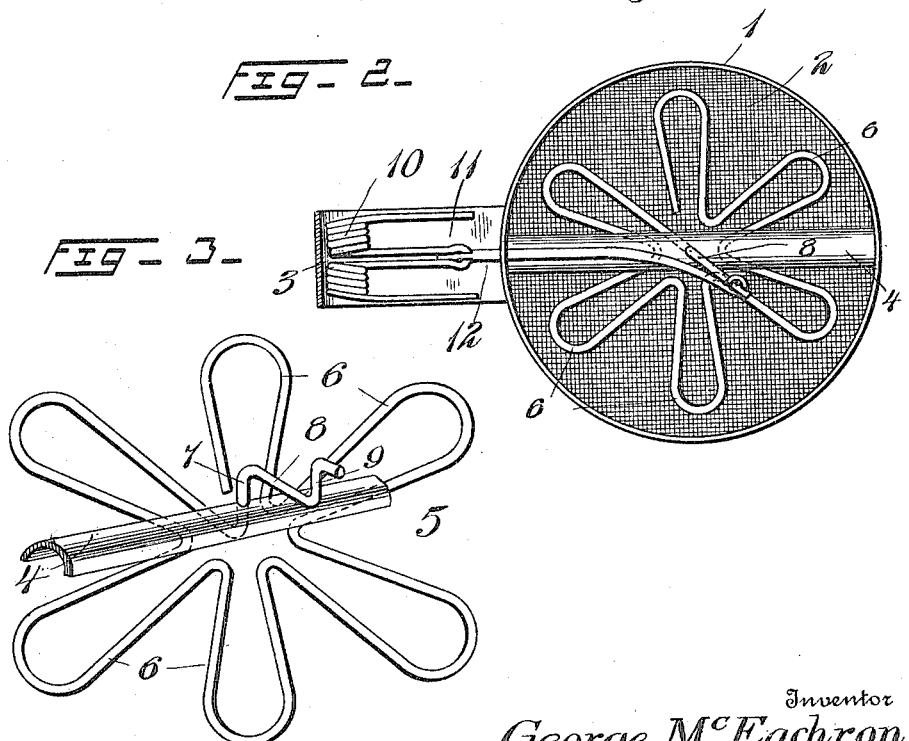
Inventor
George McEachron.
By Victor J. Evans
Attorney
Witnesses

UNITED STATES PATENT OFFICE.

GEORGE McEACHRON, OF IRON RIVER, MICHIGAN.

FLOUR-SIFTER.

1,137,068.

Specification of Letters Patent. Patented Apr. 27, 1915.

Application filed March 3, 1913. Serial No. 753,053.

*To all whom it may concern:*

Be it known that I, GEORGE MCEACHRON, a citizen of the United States, residing at Iron River, in the county of Iron and State of Michigan, have invented new and useful Improvements in Flour-Sifters, of which the following is a specification.

This invention relates to flour sifters, and the prime object of the invention is to produce a scoop sifter having a handle and an agitator which may be operated by the hand grasping the handle, the whole being of simple and improved construction.

A further object of the invention is to simplify and improve the construction of the agitator and the manner of mounting the same.

A further object of the invention is to provide simple and improved means for actuating the agitator.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation with parts broken away to show the construction. Fig. 2 is a top plan view with a part of the handle broken away. Fig. 3 is a perspective detail view showing the agitator and a portion of the cross bar supporting the same.

Corresponding parts in the several figures are denoted by like characters of reference.

The scoop 1 has a flat screen bottom 2, and said scoop is provided with a handle 3. Fitted in the scoop directly above the screen bottom is a cross bar 4 affording a support for the agitator 5. The latter element, as will be best seen by reference to Fig. 3, is formed of a single piece of wire, the same being bent in an approximately horizontal plane to form a plurality of loops 6 substantially radiating from a common center, one limb of one of the loops being extended inwardly to said center and bent to form an upwardly extending approximately vertical shaft 7 having a crank 8 provided with a terminal wrist 9. The shaft 7 is supported for rotation by the cross bar 4, the loops of the agitator resting flatwise on the screen 2 between the latter and the cross bar, which latter is spaced sufficiently above the screen to permit of the oscillation of the agitator.

Supported within the handle 3 is a double spring coil 10 having intermediate the ends thereof a downwardly extending arm or yoke 11 forming a loop which receives one end of a pitman 12, which has a flattened portion 12′ loosely engaging the loop with which it is thus flexibly connected, said pitman being guided through the wall of the scoop and terminally connected at its inner end with the wrist 9. The limbs of the yoke 11 are spaced slightly apart and are in substantially parallel relation to each other, the distance between the limbs being less than the diameter of the pitman or connecting member 12, the flattened or reduced portion of which may thus be readily introduced between the limbs and will be held securely against displacement when introduced. The double spring coil 10 is connected with the upper portion of the handle at a point distant from the wall of the scoop, and the lower end of the yoke 11 extends normally in the direction of the wall of the scoop.

It will be seen that grasping the handle and the spring yoke and exerting pressure upon the latter, the pitman will be drawn outward, thus rocking or oscillating the shaft carrying the agitator in one direction. When pressure on the spring yoke is released, the pitman will be pushed inwardly with respect to the scoop, thereby rocking the shaft carrying the agitator in a reverse direction. This operation may be quickly repeated as often as may be needed by a simple pressure of the hand of the operator holding the scoop, and the combined scoop and sifter may thus be manipulated with one hand, leaving the other hand of the operator free to perform other work. This is especially convenient in the making of batter and the like when one hand may be utilized for shifting the flour, while with the other hand the batter may be stirred.

It will be seen from the foregoing that a construction is provided which is exceedingly simple and in which the parts, when assembled will coöperate efficiently without danger of being accidentally separated. The resilient yoke which depends from the double spring coil is formed with its limbs spaced very slightly apart and lying in substantially parallel relation throughout. The pitman or connecting member 12 having the flattened or reduced portion 12′ is assembled with the yoke by simply inserting the reduced portion between the limbs thereof and sliding it to the lower end of the yoke, this being done at some proper stage during the assemblage of the parts. The bridge piece at the lower end of the yoke will prevent the connecting member escaping in a downward direction, and longitudinal displacement is prevented owing to the fact that the yoke engaging portion of the pitman is reduced to a width about equal to the distance between the limbs of the yoke, the terminals of the reduced portion forming shoulders or abutments engaged by the yoke. The lower portion of the handle member 3 is thus in no wise depended upon to maintain the parts in operative condition.

Having thus described the invention, what is claimed as new, is:—

In a device of the class described, a scoop having a handle and a screen bottom, an agitator supported for rotation above the screen bottom and having a crank, a double coiled spring supported within the handle and having a yoke with substantially parallel limbs slightly spaced apart extending within the handle, and a connecting member guided through the wall of the scoop, one end of said member being connected with the agitator crank, and the other end of said member having a reduced portion engaging the loop of the yoke.

In testimony whereof I affix my signature in presence of two witnesses.

GEORGE McEACHRON.

Witnesses:
MARTIN S. McDONOUGH,
DANIEL J. O'HARA.

Copies of this patent may be obtained for five cents each, by addressing the "Commissioner of Patents, Washington, D. C."